United States Patent
Kato (10) Patent No.: US 6,910,670 B2
(45) Date of Patent: Jun. 28, 2005

(54) SUSPENSION RUBBER BUSHING OF VERTICAL MOUNT TYPE

(75) Inventor: Kazuhiko Kato, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/681,662

(22) Filed: Oct. 7, 2003

(65) Prior Publication Data

US 2004/0084601 A1 May 6, 2004

(30) Foreign Application Priority Data

Oct. 30, 2002 (JP) ........................................ 2002-316698

(51) Int. Cl.[7] .............................................. F16M 13/00
(52) U.S. Cl. .................. 248/608; 248/562; 267/140.12
(58) Field of Search ................................ 248/633, 580, 248/562, 608, 609; 267/140.12

(56) References Cited

U.S. PATENT DOCUMENTS

| | | | | |
|---|---|---|---|---|
| 3,698,703 A | * | 10/1972 | Hipsher | 267/219 |
| 4,717,111 A | * | 1/1988 | Saito | 267/140.12 |
| 4,834,351 A | * | 5/1989 | Firma Carl Freudenberg et al. | 267/140.12 |
| 4,861,004 A | * | 8/1989 | Yokota et al. | 267/140.12 |
| 4,883,260 A | * | 11/1989 | Kanda | 267/140.12 |
| 4,893,798 A | * | 1/1990 | Hibi et al. | 267/140.12 |
| 5,076,532 A | | 12/1991 | Noguchi | |
| 5,188,346 A | * | 2/1993 | Hamada et al. | 267/140.12 |
| 5,190,269 A | * | 3/1993 | Ikeda et al. | 267/140.12 |
| 5,299,788 A | * | 4/1994 | Kanda | 267/140.12 |
| 5,413,319 A | * | 5/1995 | Hein et al. | 267/140.12 |
| 5,725,202 A | * | 3/1998 | Nakamura et al. | 267/140.12 |
| 5,975,509 A | * | 11/1999 | Miyamoto | 267/140.12 |
| 6,102,380 A | * | 8/2000 | Tsutsumida | 267/140.12 |
| 6,224,046 B1 | * | 5/2001 | Miyamoto | 267/281 |
| 6,698,731 B2 | * | 3/2004 | Thornhill | 267/140.12 |

FOREIGN PATENT DOCUMENTS

| | | |
|---|---|---|
| JP | 2538464 | 7/1996 |
| JP | 2556935 | 8/1997 |
| JP | 2001-271865 | 10/2001 |

* cited by examiner

*Primary Examiner*—Anita M. King
(74) *Attorney, Agent, or Firm*—Beyer Weaver & Thomas LLP (57) ABSTRACT

A vertical mount rubber bushing including a rubber elastic body elastically connecting inner and outer sleeve, wherein the rubber elastic body having cross sectional shapes viewed in a first direction of prizing force input where rubber legs are affixed to an axially center portion of the inner sleeve and extend towards opposite axial ends of the inner sleeve, towards the outer sleeve and away from the inner sleeve to either axial side of the axially center portion, thereby forming depressed spaces partially defined by the rubber legs and situated on either axial side of the axially center portion, and viewed in a second direction orthogonal to the first direction, where main body rubber portions thicker than the rubber legs elastically connect the inner and outer sleeves while extending in the second direction with a shape generally increasing in length in an axial direction moving from the outer sleeve toward the inner sleeve.

9 Claims, 7 Drawing Sheets

PRIOR ART

SUSPENSION RUBBER BUSHING OF VERTICAL MOUNT TYPE

INCORPORATED BY REFERENCE

The disclosure of Japanese Patent Application No. 2002-316698 filed on Oct. 30, 2002 including the specification, drawings and abstract is incorporated herein by reference in its entirety.

BACKGROUND OF THE INVENTION

1. Field of the Invention

The present invention relates generally to a suspension rubber bushing adapted to be installed in a suspension assembly to exhibit desired damping effect, and more particularly to a suspension rubber bushing of vertical mounted type that is used with its bushing axis oriented vertically.

2. Description of the Related Art

Conventionally, a suspension rubber bushing (hereinafter simply referred to as a "rubber bushing") may be disposed at a linkage point between a vehicle body and a control arm in an automobile suspension, in order to ensure turning of the control arm, and to provide vibration damping between the control arm and vehicle body, so that the vehicle body and suspension are elastically linked via the rubber bushing.

Figure 6:
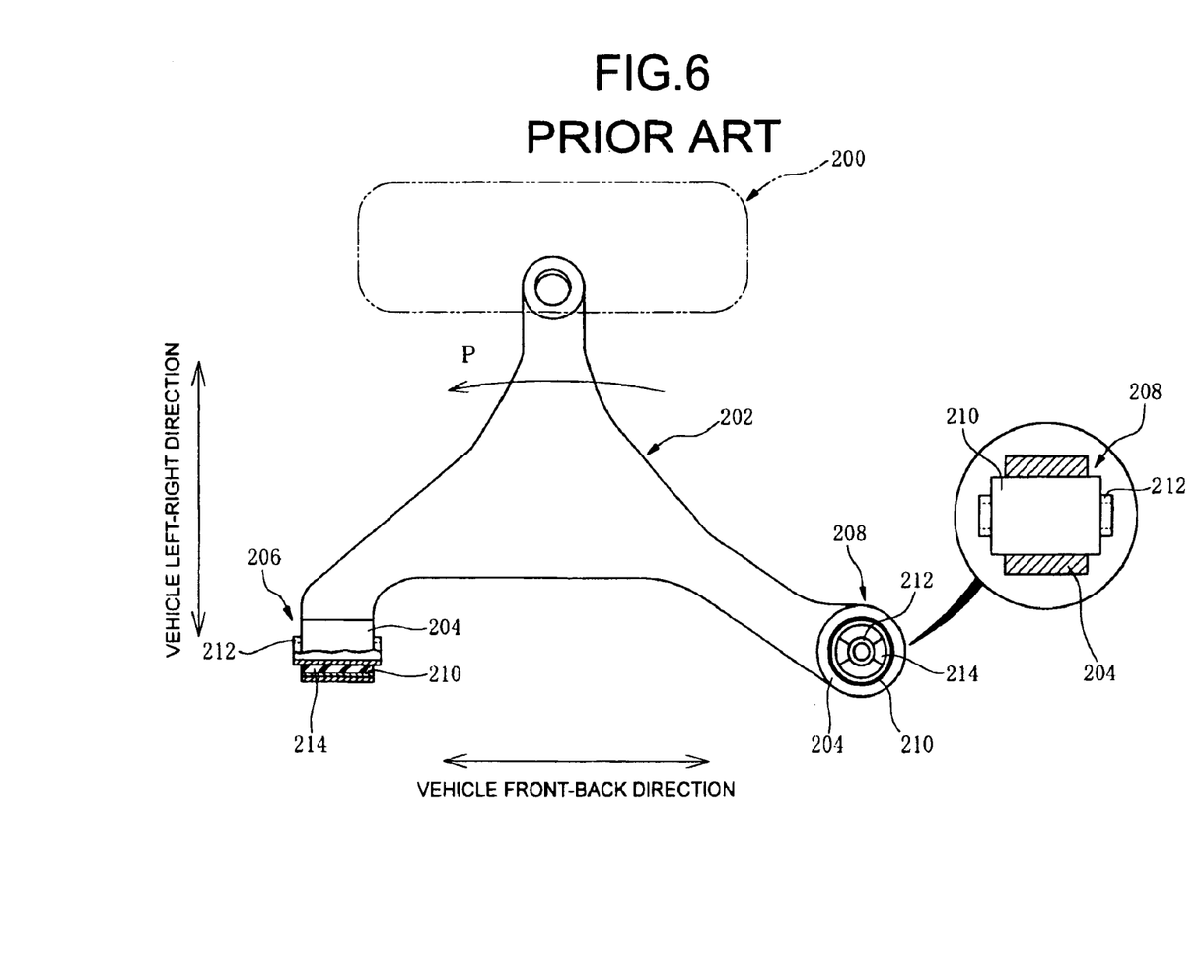
FIG. 6 is an illustration of an exemplary conventional rubber bushing assembled with a suspension.

FIG. 6 illustrates an example of such a suspension system. In the drawings, 200 denotes a tire, and 202 a control aim having fixing bores 204 disposed at bifurcated front and rear end portions thereof, with a rubber bushing 206 secured press-fit into one of the fixing bores 204 (i.e., the front one). A rubber bushing 206 has an outer metallic sleeve 210, an inner metallic sleeve 212, and a rubber elastic body 214 interposed therebetween, elastically connecting the inner and outer sleeves 210, 212. This rubber bushing 206 is press fitted at its outer sleeve 210 into the fixing bore 204, and at its inner sleeve 212 is linked to the vehicle body. It is noted that the rubber bushing 206 is employed in a horizontal mounting in which a bushing axis is oriented on the horizontal (front-back orientation).

In contrast to the aforesaid conventional arrangement, there has in recent years been research into the use of a vertical mount rubber bushing 208 in which the bushing axis is oriented vertically, as the rubber bushing on the other fixing bore 204 (i.e., the back one). In the case of the vertical mount rubber bushing 208, both of the outer and inner sleeves 210, 212 are oriented vertically, the two being elastically connected by means of the rubber elastic body 214. The fixing bore 204 is also oriented vertically so that the rubber bushing 208 is press fitted therein.

In the present vertical mount rubber bushing 208, the body or main portion of the rubber elastic body 214 having a large thickness is oriented to extend so as to connect the outer sleeve 210 and the inner sleeve 212 in approximately the vehicle front-back direction, and has a high spring constant in the same direction, while having a soft spring constant in approximately the vertical left-right direction at a right angle thereto. This arrangement provides good absorption of shock and vibration when the tire 200 rides over a bump during driving.

When the tire 200 rises over a bump, the control arm 202 attempts to undergo rotational motion in the direction indicated by arrow P in FIG. 6. Since the rubber bushing 208 has soft spring characteristics in the direction of input of force applied at this time, and readily deforms in response thereto, thereby providing good moderation of the shock applied to the tire 200, and effectively damping transmission of shock to the vehicle body.

Where the vertical mount rubber bushing 208 is used at one end of the control arm 202, the vertical mount rubber bushing 208 is likely to suffer from a high level of prizing force when the control arm 202, in association with up and down motion of the tire 200, rotates up and down about a supporting portion, which is the linkage point of the control arm 202 to the vehicle body by means of the rubber bushing 206, 208. In this regards, meant by "prizing force" is force oriented so as to tilt the inner sleeve 212 relative to the outer sleeve 210.

Figure 7:
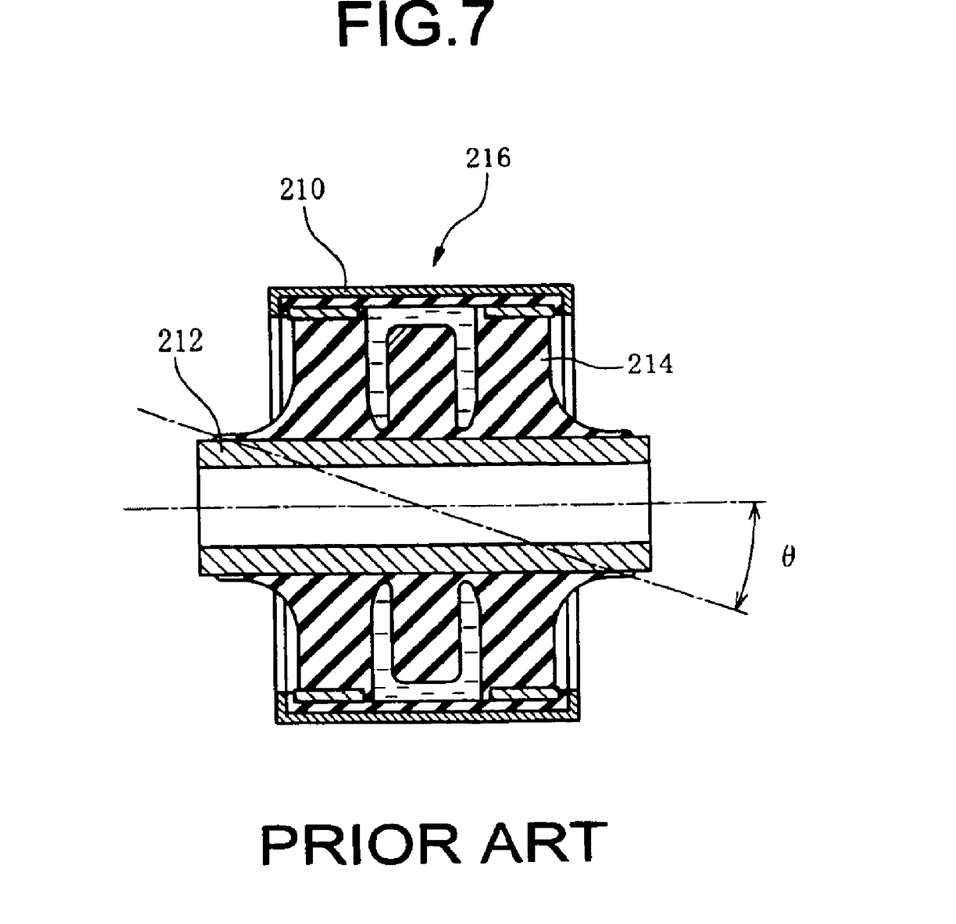
FIG. 7 is a vertical cross sectional view of an example of a conventional rubber bushing of horizontal mount type.

That is, if a rubber bushing 216 of a conventional horizontal mount type as shown in FIG. 7, for example, is used without modification in a vertical mount as a vertical mount rubber bushing of the aforesaid type, the problem becomes significant. Namely, when subjected to prizing force, the inner sleeve 212 tilts appreciably at an angle $\theta$ with respect to the outer sleeve 210, producing a high level of strain in the rubber elastic body 214 at this time. This results in a likelihood of earlier fatigue of the rubber bushing 216 with repeated input of prizing force.

As one means of solution of this problem, it would be conceivable to affix the rubber elastic body to the axially center portion of the inner sleeve, and to form depressed spaces situated to either axial side of this center portion and between the inner sleeve and the rubber elastic body, as disclosed in the following Patent Documents 1 and 2.

[Patent Document 1]

JP-B-2538464

[Patent Document 2]

JP-A-2001-271865

However, where the rubber elastic body is shaped to have an approximately constant cross sectional shape over its entire circumference, the rubber bushing 208 is able to achieve a high level of endurance against applied force based on rotational motion of the control arm 202 in the vertical direction in FIG. 6, for example, but fails to achieve an intended function due to its spring constant that becomes small in the approximately front-back direction in FIG. 6. Also, the rubber bushing 208 suffers from appreciable deformation of rubber elastic body 214 when subjected to load in this front-back direction, so that endurance life in this direction declines.

SUMMARY OF THE INVENTION

It is therefore one object of this invention to provide a suspension rubber bushing of vertical mount type that is capable of solving the aforesaid problem.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure of its entirety.

(1) A suspension rubber bushing of vertical mount type attachable in a suspension assembly with a bushing axis vertically oriented, comprising: an inner sleeve; an outer sleeve disposed about the inner sleeve with a radial spacing therebetween; and a rubber elastic body interposed between and elastically connecting the outer and inner sleeves, wherein the rubber elastic body is formed with a shape, as viewed in vertical cross section in a first direction coincident with a direction of prizing force input, having rubber legs affixed to an axially center portion of the inner sleeve, the rubber legs extending towards mutually opposite axial ends, towards the outer sleeve and away from the inner sleeve so as to form depressed spaces between the rubber legs and the inner sleeve to either axial side of the axially center portion, and as viewed in vertical cross section in a second direction approximately orthogonal to the first direction, having a main body rubber portion thicker than the rubber legs and elastically linking the inner sleeve and outer sleeve while extending in the second direction, the main body rubber portion formed with a shape generally increasing in length in an axial direction moving from the outer sleeve toward the inner sleeve.

The suspension rubber bushing of vertical mount type according to the present invention (hereinafter referred to as a "vertical mount rubber bushing"), is arranged such that the rubber elastic body has a vertical cross sectional shape viewed in the first direction coincident with the direction of prizing force input, in which rubber legs are affixed to the axially center portion of the inner sleeve, forming depressed spaces situated to either axial side thereof and between the rubber elastic body and the inner sleeve, and another vertical cross sectional shape viewed in the second direction approximately orthogonal to the first direction, in which axial length of the rubber elastic body is gradually increases moving from the outer sleeve towards the inner sleeve.

Namely, the vertical mount rubber bushing of the present invention is arranged such that the axially exterior face shape of the rubber elastic body in two orthogonal directions are mutually reversed. This arrangement makes it possible for the vertical rubber mount bushing to minimize deformation and strain of the rubber elastic body against input of prizing force, thereby extending an endurance life thereof, as well as to have a high spring constant and high endurance life thereof in the second direction orthogonal to the first direction.

(2) A suspension rubber busing of vertical mount type according to the above-indicated mode (1), wherein a first fluid chamber is formed on a first side of the inner sleeve in the first direction, and a second fluid chamber is formed to the opposite side thereof, the rubber legs constituting the walls of the first and second fluid chambers with the fluid chambers mutually held in fluid communication via a communication passage.

In this mode, separate first and second fluid chambers are formed at locations to either side of the inner sleeve in the first direction and to the inside of the rubber legs, whereby the walls of the fluid chambers are constituted by the rubber legs, while the first and second fluid chambers are held in fluid communication with each other via the communication passage. With this arrangement, the vertical mount rubber bushing can exhibit vibration-damping effect with the help of resonance or flows of the fluid through the communication passage between the first and second fluid chambers.

(3) A suspension rubber bushing of vertical mount type attachable in a suspension assembly with a bushing axis vertically oriented comprising: an inner sleeve; an outer sleeve disposed about the inner sleeve with a radial spacing therebetween; and an rubber elastic body interposed between and elastically connecting the outer and inner sleeves, wherein the rubber elastic body is shaped such that, as viewed in vertical cross section in a first direction, an inner bonding surface bonded to the inner sleeve extends with an axial distance La at an axially center portion of the inner sleeve, while an outer bonding surface bonded to the outer sleeve extends with an axial distance Lb that is larger than the axial distance La (La<Lb) so that the rubber elastic body extends from the axially center portion of the inner sleeve toward the outer sleeve while extending towards mutually opposite axial ends of the outer sleeve, and as viewed in cross section in a second direction approximately orthogonal to the first direction, the inner bonding surface extends with an axial distance Lc that is larger than the axial distance La (La<Lc), while the outer bonding surface extends with an axial distance Ld that is smaller than Lc (Lc>Ld).

As well known in the art, when the suspension rubber bushing is subjected to prizing force, the greater the axial distance from an axially center of the bushing, the greater the amount of displacement relative to the inner and outer sleeves caused by the applied prizing force. When the present suspension rubber bushing is attached to the suspension assembly with the first direction approximately coincident with a direction of prizing force input, small is the axial distance La of the inner bonding surface of the rubber elastic body in vertical cross section in the first direction of prizing force input, rather than the axial distance Lc of the inner bonding surface of the rubber elastic body in vertical cross section in the second direction of no or few prizing force input (La<Lc). This arrangement makes it possible to effectively minimize deformation of the rubber elastic body connecting the inner and outer sleeves, when the rubber bushing is subjected to prizing force applied thereto in the first direction. Furthermore, the rubber elastic body in vertical cross section is shaped such that the rubber elastic body extends from the axially center portion of the inner sleeve toward the outer sleeve while extending towards mutually opposite axial ends of the outer sleeve. With this arrangement, the rubber elastic body is bonded to the inner sleeve at a location situated near a pivot of turning or tilt of the inner sleeve relative to the outer sleeve, thereby further minimizing deformation of the rubber elastic body during prizing force input.

Further, in the rubber elastic body viewed in vertical cross section in the first direction of prizing force input, the outer bonding surface extends with the axial distance Lb that is made larger than the axial distance La of the axial distance of the inner bonding surface (La<Lb). This arrangement makes it possible to obtain a sufficient volume of the rubber elastic body in vertical cross section of the first direction, further improving durability of the rubber elastic body and the rubber bushing, while assuring high degree of freedom in designing a radial spring of the rubber bushing, and desired spring stiffness and durability of the rubber bushing with respect to axial or radial load applied thereto.

Yet further, the rubber elastic body viewed in vertical cross section in the second direction, the inner bonding surface extends with the axial distance Lc that is made larger than the axial distance Ld of the axial distance of the outer bonding surface (Lc>Ld). With this arrangement, the rubber bushing can readily exhibit a required spring stiffness with respect to a load applied thereto in the second direction that is approximately coincident with a vehicle front-back direction when attached in the suspension assembly, thus ensuring an excellent drivability. Namely, in order to enhance the spring stiffness of the rubber bushing, the key is obtaining a sufficient volume at the radially inner side where the circumferential length of the rubber elastic body is naturally small. The above-described arrangement according to the present mode (3), the axial distance Lc of the inner bonding surface effectively increases, thereby obtaining the sufficient volume of the rubber elastic body at the radially inner side thereof, resulting in good spring stiffness of the rubber bushing in the vehicle front-back direction.

(4) A suspension rubber bushing according to the above-mentioned mode (3), wherein, as viewed in vertical cross section in the first direction, the inner sleeve includes a projection formed at the axially center portion thereof so as to protrude in opposite radially outward directions, and the inner bonding surface of the rubber elastic body is bonded to the projection such that the projection is embedded within an radially inner portion of the rubber elastic body. This arrangement effectively increasing an area of the inner bonding surface of the rubber elastic body, at which the rubber elastic body is bonded to the inner sleeve, making it possible to reduce local stress concentration at the bonding interface between the inner sleeve and the rubber elastic body, leading to further enhanced durability of the rubber elastic body.

(5) A suspension rubber bushing according to the above-indicated mode (4), wherein the inner bonding surface of the rubber elastic body is bonded at least partially to axially opposite side faces of the projection. This arrangement further facilitates to obtain a desired free length of the rubber elastic body.

(6) A suspension rubber bushing according to the above-indicated mode (4) or (5), wherein the inner sleeve further includes a pair of recessed portions formed at either axial side of the projection so as to extend circumferentially continuously over an entire circumference of the inner sleeve, and the recessed portions are embedded with a pair of rubber layers both integrally connected to opposite axial end portions of the radially inner portion of the rubber elastic body, respectively. With this arrangement, the free length of the rubber elastic body is substantially elongated, resulting in further enhanced durability of the rubber bushing.

(7) A suspension rubber bushing according to the any one of the above-indicated modes (4)–(6), wherein the projection has an approximately rectangular shape with round corners, as viewed in vertical cross section in the first direction. With the presence of the round corners, the spring generated in the rubber elastic body are moderated when the inner sleeve tilts relative to the outer sleeve due to prizing force input, thus exhibiting high endurance life of the rubber elastic body.

(8) A suspension rubber bushing according to any one of the above-indicated modes (4)–(7), wherein the projection at least partially constitute a stop mechanism for limiting displacement of the outer sleeve relative to the inner sleeve in one direction perpendicular to an axial direction as viewed in vertical cross section in the first direction. Preferably, the projection is brought into abutting contact with the outer sleeve member via a rubber buffer for limiting the amount of displacement of the inner sleeve relative to the outer sleeve in a shock absorbing fashion.

(9) A suspension rubber bushing according to any one of the above-indicated modes (3)–(8), further comprising a pair of fluid chambers situated, as viewed in vertical cross section in the first direction, to be opposed to each other with the inner sleeve interposed therebetween in one radial direction perpendicular to an axial direction of the inner sleeve, each of the fluid chambers being partially defined by axially opposite side walls formed by the rubber elastic body, and the side walls extending approximately straightly from the inner sleeve towards the outer sleeve, while being spaced away from each other in an axial direction of the bushing.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

FIGS. 1–4 shows a suspension rubber bushing of vertical mount type in the form of a vertical mount rubber bushing 10 constructed according to a presently preferred embodiment of the invention. The vertical mount rubber bushing 10 includes an outer sleeve 12 of metal, an inner sleeve 14 of metal, and a rubber elastic body 16 interposed between and elastically connecting the outer and inner sleeves 12, 14.

Figure 1:
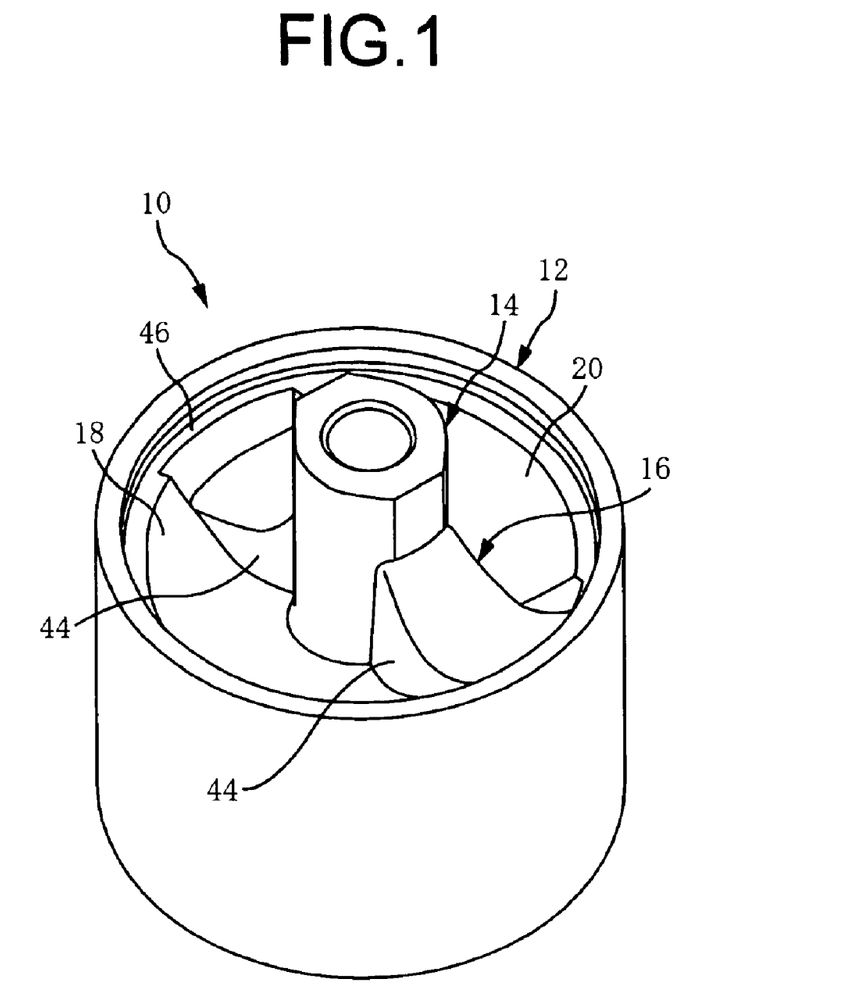
FIG. 1 is a perspective view of a suspension rubber bushing in the form of a rubber bushing constructed according to one preferred embodiment of the invention.
Figure 2:
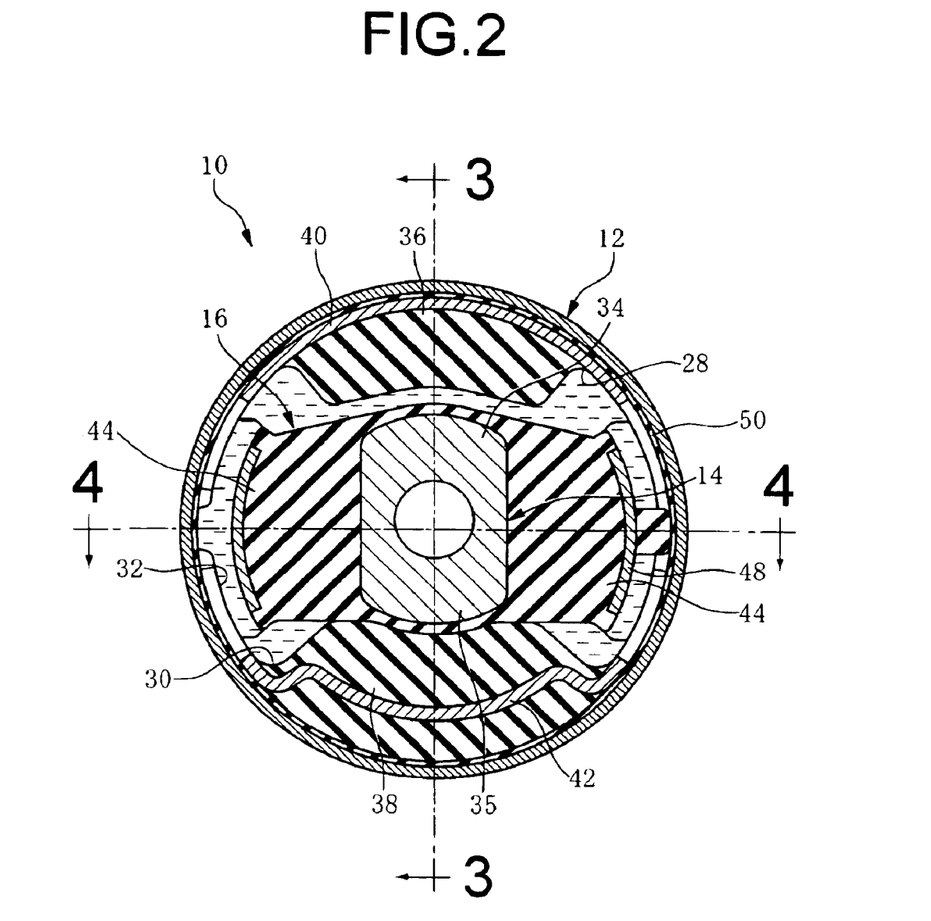
FIG. 2 is a transverse cross sectional view of the rubber bushing of FIG. 1.
Figure 3:
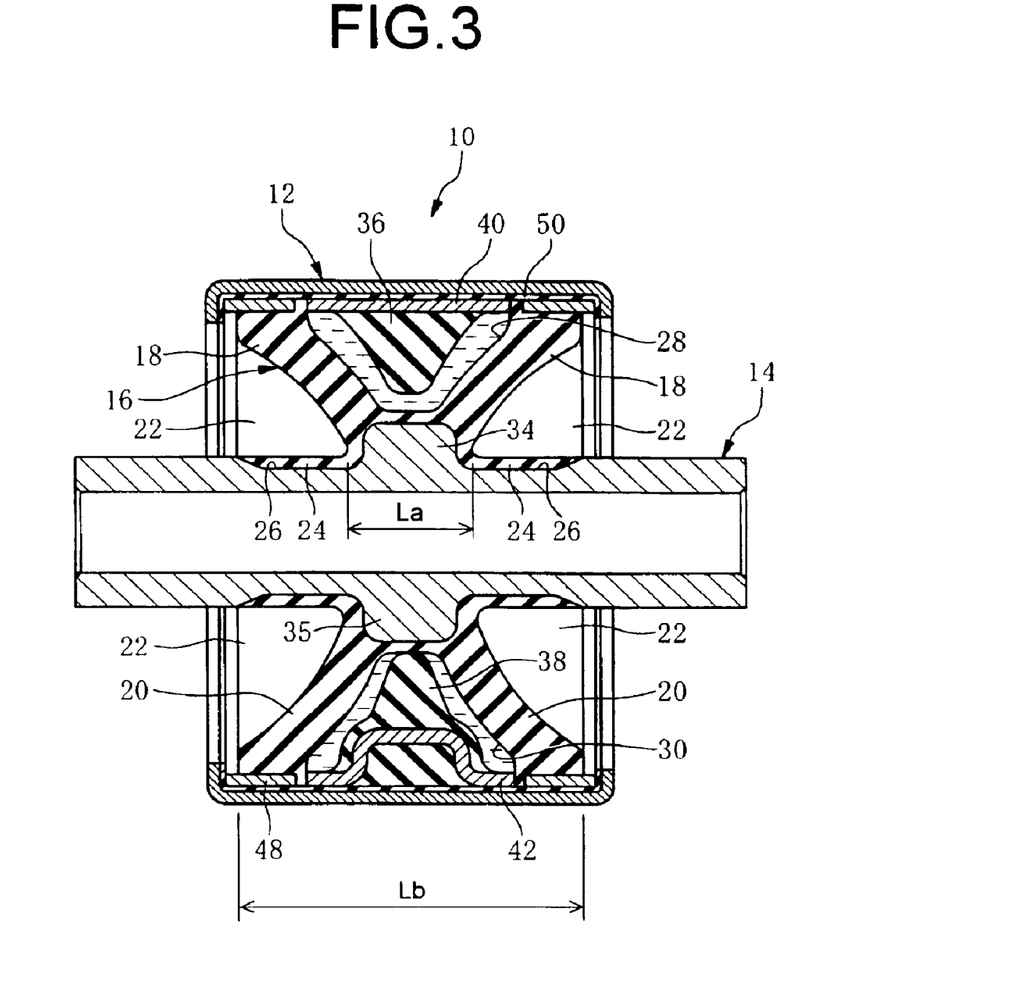
FIG. 3 is a cross sectional view taken along line 3—3 of FIG. 2.

FIG. 3 is a cross sectional view taken along line 3—3 of FIG. 2, i.e., a vertical or axial cross section taken in a first direction coincident with prizing force input direction. As shown in FIG. 3, the rubber elastic body 16 has a pair of rubber legs 18, 18 of predetermined wall-thickness, which open out in a "V" configuration on the upper side of the inner sleeve 14 as seen in FIG. 3. On the other hand, a pair of rubber legs 20, 20 of predetermined wall-thickness, which open out in an inverted "V" configuration on the lower side of the inner sleeve 14 as seen in FIG. 3. These rubber legs 18, 20 are of symmetrical shape in the vertical direction in FIG. 3.

The rubber legs 18 are integrally bonded in a process of vulcanization of a rubber material for forming thereof to an axially center portion of the inner sleeve 14. The rubber legs 18 have a shape extending from the axially center portion towards the axial ends, as well as towards the outer sleeve 12 away from the inner sleeve 14. With this arrangement, a pair of depressed spaces 22 formed between the inner sleeve 14 and the pair of rubber legs 18, 18. Likewise, the rubber legs 20 of inverted "V" configuration on the lower side of the inner sleeve 14 as seen in FIG. 3, are integrally bonded in a process of vulcanization of a rubber material for forming the rubber legs to the axially center portion of the inner sleeve 12. The rubber legs 20 have a shape extending from the axially center portion towards the axial ends, as well as towards the outer sleeve 12 away from the inner sleeve 14, with a pair of depressed spaces 22 formed between the inner sleeve 14 and the pair of rubber legs 20, 20.

In other words, the rubber elastic body 16 is bonded at its inner bonding surface to the inner sleeve 14 and at its outer bonding surface to the outer sleeve 12 with a specific shape. Described in detail, the rubber elastic body 16 is shaped such that, as viewed in vertical cross section in the first direction shown in FIG. 3, the inner bonding surface bonded to the inner sleeve 14 extends with an axial distance La at an axially center portion of the inner sleeve 14, while an outer bonding surface bonded to the outer sleeve 12 extends with an axial distance Lb that is larger than the axial distance La (La<Lb) so that the rubber elastic body 16 extends from the axially center portion of the inner sleeve 14 toward the outer sleeve 12 while extending towards mutually opposite axial ends of the outer sleeve 12.

In the present embodiment, a pair of rubber layers 24, 24 are formed so as to be connected to the rubber legs 18, 20, and so as to be integrally bonded by means of vulcanization of a rubber material for forming the rubber layers 24 to the inner sleeve 14, embedded within a pair of recessed portions 26, 26 formed on the inner sleeve member 14. These recessed portions 26 extend with an entire circumference of the inner sleeve member with a substantially constant depth dimension. The provision of the recessed portions 26 is effective to make the free length of the rubber legs 18, 20 long, and to substantially increase a bonding surface of the rubber legs 18, 20 with respect to the inner sleeve 14. The rubber legs 18, situated on the upper side (i.e., the first side) of the inner sleeve 14 as seen in FIG. 3, cooperate to define therebetween a first fluid chamber 28, with the rubber legs 18 constituting the walls of the first fluid chamber 28. On the other hand, the rubber legs 20, situated on the lower side of the inner sleeve 14 as seen in FIG. 3, cooperate to define therebetween a second fluid chamber 30, with the rubber legs 20 constituting the walls of the second fluid chamber 30. That is, the rubber legs 18, 20 define the walls of the first and second fluid chambers 28, 30, and extending approximately straightly from the inner sleeve 14 towards the outer sleeve 12, while being spaced away from each other in an axial direction of the rubber bushing 10.

As is apparent from FIG. 2, the first fluid chamber 28 and the second fluid chamber 30 are mutually held in fluid communication via a communication passage 32, so that a mass of a fluid present in the first fluid chamber 28 is able to flow into the second fluid chamber 30 through the communication passage 32, and vise versa. The respective openings of the first fluid chamber 28 and the second fluid chamber 30 are provided closure by covering members 40, 42 in the form of metallic plates, respectively. Rubber stoppers 36, 38 are integrally bonded in the process of vulcanization of a rubber material for forming the rubber stoppers 36, 38 to the covering members 40, 42, respectively, introducing into the first fluid chamber 28 and the second fluid chamber 30, respectively.

On the inner sleeve 14, a projection in the form of metallic stoppers 34, 35 are integrally formed so as to be opposed to the rubber stoppers 36, 38, respectively, and to project out towards the first fluid chamber 28 and the second fluid chamber 30, respectively. Each of the metallic stoppers 34, 35 has an approximately rectangular shape with round corners as viewed in vertical cross section in the first direction, and at least partially constitutes a stop mechanism for limiting displacement of the outer sleeve 12 relative to the inner sleeve 14 in a radial direction perpendicular to an axial direction of the inner sleeve 14. The rubber legs 18, 20 are formed so that the portions thereof affixed to the inner sleeve 14 cover these metal stoppers 34, 35, respectively. That is, the metallic stoppers 34, 35 are embedded within the rubber legs 18, 20, or within a radially inner portion of the rubber elastic body 16.

Figure 4:
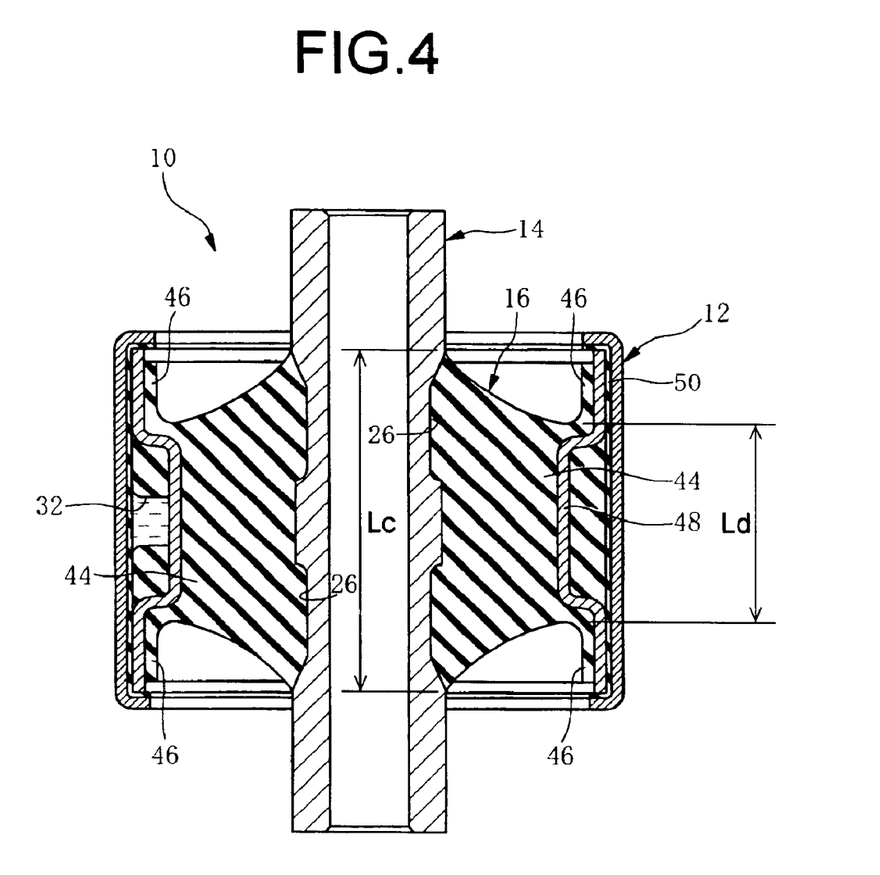
FIG. 4 is a cross sectional view taken along line 4—4 of FIG. 2.

FIG. 4 shows a cross sectional shape taken along line 4—4 in FIG. 2, i.e., a vertical section in the second direction approximately orthogonal to the first direction which is the direction of the prizing force input. As shown in FIGS. 2 and 4, 44 denotes a main body rubber portion which is the body of the rubber elastic body 16, and that is thicker than the aforesaid rubber legs 18, 20. The main body rubber portions 44, 44 extend in the lateral directions as seen in FIG. 4, i.e., the second direction, and connect the inner sleeve 14 and the outer sleeve 12 in this lateral direction as seen in FIG. 4. It should be noted that the main body rubber portion 44 has a spring constant in the axial orthogonal direction, i.e., lateral direction in FIGS. 2 and 4, that is greater than the spring constant of the aforementioned rubber legs 18, 20 in the vertical direction in FIG. 3.

In other words, the rubber elastic body 16 is shaped such that, as viewed in cross section in a second direction approximately orthogonal to the first direction shown in FIG. 4, the rubber elastic body 16 is shaped such that the inner bonding surface extends with an axial distance Lc that is larger than the axial distance La (La<Lc), while the outer bonding surface extends with an axial distance Ld that is smaller than Lc (Lc>Ld).

According to the present embodiment, the shape of the axially exterior face of the main body rubber portions 44, 44 is an approximately diagonal shape that comes closer to the axial ends, going from the side of the outer sleeve 12 towards the side of the inner sleeve 14. That is, the main body rubber portions 44, 44 situated on the left and right sides of the inner sleeve 14 in FIG. 4 are formed with a shape whose axial-direction length gradually increases, going from the side of the outer sleeve 12 towards the side of the inner sleeve.

As shown in FIG. 4, rubber films 46 are connected to and integrally formed with the main body rubber portion 44 of the rubber elastic body 16. These rubber films are integrally bonded in the process of vulcanization of a rubber material for forming thereof to a center sleeve 48 together with the main body rubber portions 44. The center sleeve 48 is secured mated with outer sleeve member 12 via a sealing rubber layer 50 of film form.

Figure 5A:
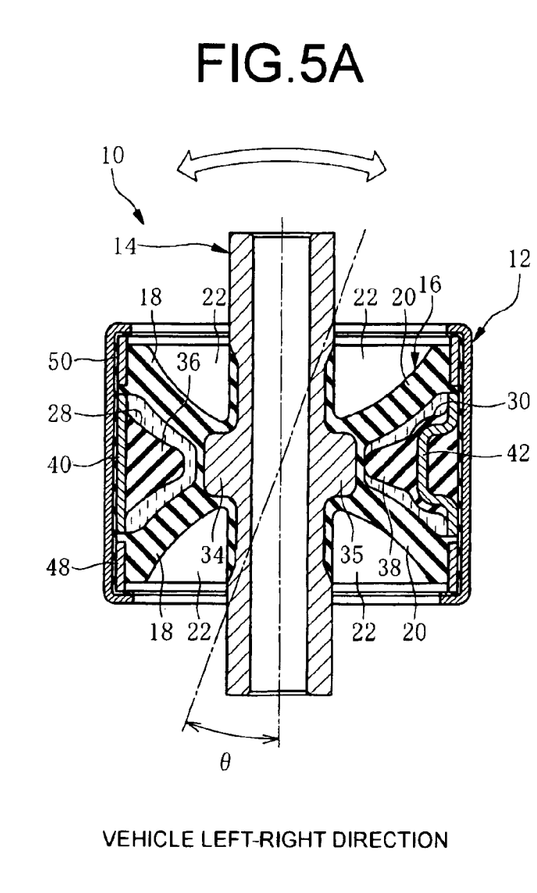
FIGS. 5A and 5B are illustrations for explaining action of the rubber bushing of FIG. 1 in response to prizing force applied thereto.

According to the vertical mount rubber bushing 10 of the present embodiment, as illustrated in FIG. 5A, the rubber elastic body 16, and specifically the rubber legs 18, 20 do not undergo appreciable deformation, even if the inner sleeve 14 should tilt appreciably by angle θ with respect to the outer sleeve 12 due to prizing force input, and thus do not experience appreciable strain. As a result, even if prizing force is input repeatedly, the rubber legs 18, 20 do not readily reach their fatigue limit, thereby extending endurance life.

Figure 5B:
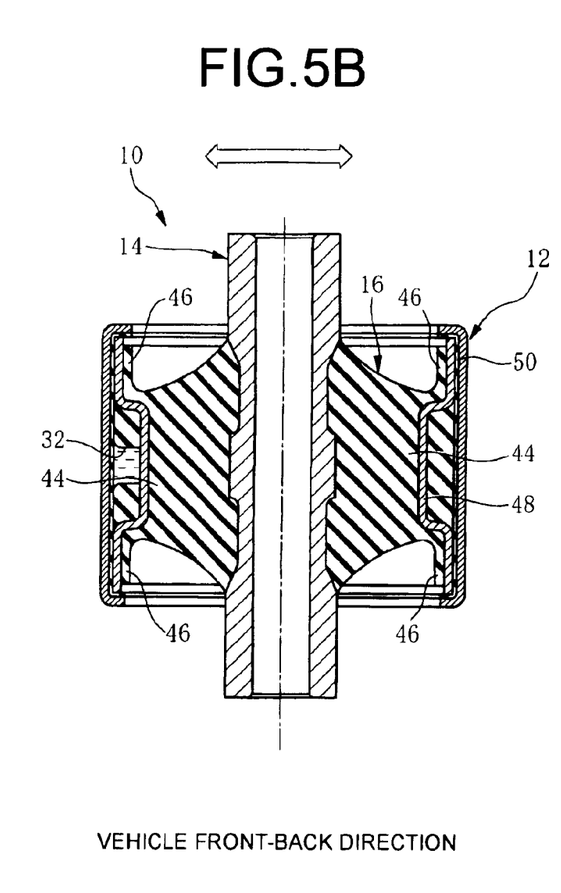

On the other hand, when the rubber bushing 10 is subjected to a load applied thereto in the lateral direction as seen in FIGS. 4 and 5B, the main rubber body portions 44 can exhibit excellent spring characteristics. As is understood from FIGS. 4 and 5B, the main rubber body portions 44 have gradually increasing axial-direction length going from the side of the outer sleeve 12 towards the side of the inner sleeve 14, thus exhibiting enhanced durability against repeated deformation in the lateral direction.

While the rubber elastic body 16 elastically connects the inner and outer sleeve members 14, 12, if the rubber elastic body 16, more specifically the main rubber body portion 44 has an approximately constant axial length in the lateral direction as seen in FIG. 4, higher strain and stress would be produced on the side of the inner sleeve 14, resulting in a tendency to reach fatigue life on the side of the inner sleeve 14. According to the present embodiment, on the other hand, the axial length of the main rubber body portions 44, i.e., the thickness of the rubber body portion 44 in the lateral direction is made larger on the side of the inner sleeve 14 where the strength of the rubber elastic body 16 has been deteriorated conventionally. This arrangement makes it possible to avoid production of high levels of strain and stress in the main rubber body portion 44 on the side of the inner sleeve 14, so that durability is enhanced when main rubber body portion 44 is subjected to repeated deformation in the lateral, axial-orthogonal direction in FIG. 4.

While the presently preferred embodiment of this invention has been described in detail for illustrative purpose only, it is to be understood that the present invention is not limited to the details of the illustrated embodiment.

For example, the first and second fluid chambers 28, 30 and the communication passage 32 for permitting a fluid communication between these chambers 28, 30 are not essential to practice the present invention. If no fluid chamber is employed in a rubber bushing of the present invention, the rubber elastic body as viewed in vertical cross section in the first direction may have a void that is filled with an air rather than liquid, or alternatively may have a solid body. Further, the projection in the form of the metallic stoppers 34, 35, may have a variety of forms including a rounded shape.

It is also to be understood that the present invention may be embodied with various other changes, modifications and improvements, which may occur to those skilled in the art, without departing from the spirit and scope of the invention defined in the following claims.

What is claimed is:

1. A suspension rubber bushing of vertical mount type attachable in a suspension assembly with a bushing axis vertically oriented, comprising:
   an inner sleeve;
   an outer sleeve disposed about the inner sleeve with a radial spacing therebetween; and
   a rubber elastic body interposed between and elastically connecting the outer and inner sleeves,
   wherein the rubber elastic body, as viewed in vertical cross section in a first direction coincident with a direction of prizing force input, has a generally "V" shape overall where a pair of rubber legs, extend approximately straightly with a substantially constant axial wall thickness, from an axially medial portion of the inner sleeve to which proximal ends of the rubber legs are bonded, to opposite axial end portions of the outer sleeve to which distal ends of the rubber legs are bonded so that the pair of rubber legs gradually extend axially outwardly as they move away from the inner sleeve toward the outer sleeve so as to form depressed spaces between axially outer faces of the rubber legs and the inner sleeve to either axial side of the axially medial portion of the inner sleeve, and
   as viewed in vertical cross section in a second direction approximately orthogonal to the first direction, has a tapered shape overall where a main body rubber portion having an axial wall thickness thicker than the rubber legs and elastically linking the inner sleeve and outer sleeve while extending in the second direction, the main body rubber portion generally increasing in length in an axial direction as it moves away from the outer sleeve toward the inner sleeve.

2. A suspension rubber bushing of vertical mount type according to claim 1, wherein a first fluid chamber is formed on a first side of the inner sleeve in the first direction, and a second fluid chamber is formed to the opposite side thereof, the rubber legs constituting the walls of the fluid chambers with the first and second fluid chambers mutually held in fluid communication via a communication passage.

3. A suspension rubber bushing of vertical mount type attachable in a suspension assembly with a bushing axis vertically oriented, comprising:
   an inner sleeve;
   an outer sleeve disposed about the inner sleeve with a radial spacing therebetween; and
   a rubber elastic body interposed between and elastically connecting the outer and inner sleeves,
   wherein the rubber elastic body, as viewed in vertical cross section in a first direction, has a generally "V" shape overall so that a minimum axial distance portion thereof having an axial distance La is adjacent to the inner sleeve and provides an inner bonding surface thereof bonded to an axial medial portion, and a maximum axial distance portion thereof having an axial distance Lb larger than the axial distance La (La<Lb) is adjacent to the outer sleeve and provides an outer bonding surface thereof bonded to the outer sleeve, and
   as viewed in cross section in a second direction approximately orthogonal to the first direction, has a generally tapered shape overall so that a maximum axial distance portion thereof having an axial distance Lc larger than the axial distance La (La<Lc) is adjacent to the inner sleeve and provides an inner bonding surface thereof bonded to the inner sleeve, and a minimum axial distance portion thereof having an axial distance Ld that is smaller than Lc (Lc>Ld) is adjacent to the outer sleeve and provides an outer bonding surface thereof bonded to the outer sleeve.

4. A suspension rubber bushing according to claim 3, wherein, as viewed in vertical cross section in the first direction, the inner sleeve includes a projection formed at the axially center portion thereof so as to protrude in opposite radially outward directions, and the inner bonding surface of the rubber elastic body is bonded to the projection such that the projection is embedded within an radially inner portion of the rubber elastic body.

5. A suspension rubber bushing according to claim 4, wherein the inner bonding surface of the rubber elastic body is bonded at least partially to axially opposite side faces of the projection.

6. A suspension rubber bushing according to claim 5, wherein the inner sleeve further includes a pair of recessed portions formed at either axial side of the projection so as to extend circumferentially continuously over an entire circumference of the inner sleeve, and the recessed portions are embedded with a pair of rubber layers both integrally connected to opposite axial end portions of the radially inner portion of the rubber elastic body, respectively.

7. A suspension rubber bushing according to claim 4, wherein the projection has an approximately rectangular shape with round corners, as viewed in vertical cross section in the first direction.

8. A suspension rubber bushing according to claim 4, wherein the projection at least partially constitute a stop mechanism for limiting displacement of the outer sleeve relative to the inner sleeve in one direction perpendicular to an axial direction as viewed in vertical cross section in the first direction.

9. A suspension rubber bushing according to claim 3, further comprising a pair of fluid chambers situated, as viewed in vertical cross section in the first direction, to be opposed to each other with the inner sleeve interposed therebetween in one radial direction perpendicular to an axial direction of the inner sleeve, each of the fluid chambers being partially defined by axially opposite side walls formed by the rubber elastic body, and the side walls extending approximately straightly from the inner sleeve towards the outer sleeve, while being spaced away from each other in an axial direction of the bushing.

* * * * *